United States Patent
Muralidhharan et al.

(10) Patent No.: US 10,360,058 B2
(45) Date of Patent: Jul. 23, 2019

(54) INPUT/OUTPUT COMPONENT SELECTION FOR VIRTUAL MACHINE MIGRATION

(71) Applicant: International Business Machines Corporation, Armonk, NY (US)

(72) Inventors: Hariganesh Muralidhharan, Bangalore (IN); Anu P. Shaw, München (DE)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 15/361,562

(22) Filed: Nov. 28, 2016

(65) Prior Publication Data

US 2018/0150310 A1 May 31, 2018

(51) Int. Cl.
| | | |
|---|---|---|
| *G06F 9/455* | (2018.01) | |
| *G06F 13/10* | (2006.01) | |
| *G06F 13/38* | (2006.01) | |

(52) U.S. Cl.
CPC ........ *G06F 9/45558* (2013.01); *G06F 13/105* (2013.01); *G06F 13/387* (2013.01); *G06F 2009/4557* (2013.01); *G06F 2009/45579* (2013.01); *G06F 2009/45595* (2013.01)

(58) Field of Classification Search
CPC .................................................. G06F 9/45533
USPC ............................................................ 718/1
See application file for complete search history.

(56) References Cited

U.S. PATENT DOCUMENTS

| | | | |
|---|---|---|---|
| 7,711,789 B1* | 5/2010 | Jnagal ................... | G06F 3/0605 709/213 |
| 7,937,518 B2* | 5/2011 | Boyd .................... | G06F 9/5077 709/226 |
| 8,830,870 B2 | 9/2014 | Cardona et al. | |
| 2009/0187899 A1* | 7/2009 | Mani ......................... | G06F 8/65 717/168 |
| 2010/0122124 A1* | 5/2010 | Chen ................... | G06F 9/45558 714/57 |
| 2010/0229181 A1* | 9/2010 | Ahuja ................... | G06F 9/4856 718/107 |
| 2010/0268816 A1* | 10/2010 | Tarui ....................... | H04L 12/00 709/224 |

(Continued)

OTHER PUBLICATIONS

Yusuf et al., "VirtualConnection: Opportunistic Networking for Web on Demand", Georgia Institute of Technology, printed Sep. 27, 2016, 12 pages.

*Primary Examiner* — Mehran Kamran
(74) *Attorney, Agent, or Firm* — Gilbert Harmon, Jr.

(57) ABSTRACT

An approach to optimizing Virtual Machine (VM) migration is provided, the approach involves receiving a request to migrate a first VM from a first server to a second server, selecting a first Input/Output (I/O) virtualization component associated with the first server and a second I/O virtualization component associated with the second server for migrating the first VM, creating a map of network adapters associated with the first and second I/O virtualization components, selecting first network adapters associated with the first I/O virtualization component and second network adapters associated with the second I/O virtualization based, at least in part, on the map of network adapters and sending an indication of the selected first and second I/O virtualization components and the selected first and second network adapters to be used for migrating the first VM.

17 Claims, 3 Drawing Sheets

(56) References Cited

U.S. PATENT DOCUMENTS

| | | | | |
|---|---|---|---|---|
| 2012/0179771 A1* | 7/2012 | Ganti | ............... | G06F 11/1425 709/213 |
| 2012/0254863 A1* | 10/2012 | Baratakke | ........... | G06F 9/45533 718/1 |
| 2013/0031341 A1* | 1/2013 | Ganti | ................ | G06F 9/5077 713/2 |
| 2013/0086298 A1* | 4/2013 | Alanis | ................ | G06F 9/4856 711/6 |
| 2013/0086582 A1* | 4/2013 | Cardona | ............. | H04L 69/12 718/1 |
| 2013/0268800 A1* | 10/2013 | Rangaiah | ............ | G06F 11/2033 714/4.11 |
| 2014/0082616 A1* | 3/2014 | Kurita | .................. | G06F 9/455 718/1 |
| 2014/0115162 A1 | 4/2014 | Kalyanaraman et al. | | |
| 2015/0029848 A1* | 1/2015 | Jain | ................... | H04L 47/6215 370/235 |
| 2015/0106608 A1* | 4/2015 | Brundidge | ............ | G06F 9/4416 713/2 |
| 2015/0234453 A1* | 8/2015 | Jin | ......................... | G06F 3/00 718/1 |
| 2016/0077938 A1* | 3/2016 | Keeriyadath | ....... | G06F 11/2002 714/4.11 |
| 2017/0242756 A1* | 8/2017 | Arroyo | .............. | G06F 11/1464 |

* cited by examiner

INPUT/OUTPUT COMPONENT SELECTION FOR VIRTUAL MACHINE MIGRATION

BACKGROUND

The present invention relates generally to the field of virtual machines, and more particularly to virtual machine migration.

In the field of computing, virtual machines (VMs), sometimes known as logical partitions (LPARs), can refer to emulated operating systems providing the functionality of a physical computer system. A hypervisor is a software or firmware component which enables the sharing and virtualization of computing resources (such as processors, persistent and volatile forms of memory, etc.) among different VMs operating on a computer system. VMs can be moved, i.e., migrated, to and from different computer systems, e.g., from a source server on which the VM operates to a destination server. A type of VM migration known as live migration refers to a process where a running VM is migrated from a source server to a destination server while still running, with minimal disruption of the operation of the VM and the services provided to end-users.

Migration of a VM from a source server to a destination server occurs via physical network adapters. In some server systems, the physical network adapters are managed by an Input/Output (I/O) virtualization component, such as, but not limited to, Virtual I/O Server (VIOS) by International Business Machines Corporation (IBM). VIOS is a component enabling the virtualization of physical I/O components, e.g., network adapters, for VMs running on a server. An I/O virtualization component (e.g., VIOS) is therefore responsible, at least in part, for the transfer of memory contents, associated with a migrating VM on a source server, to memory of a selected destination server during VM migration.

SUMMARY

According to one embodiment of the present invention, a method for optimizing Virtual Machine (VM) migration is provided, the method comprises receiving, by a component selection program, a request to migrate a first VM from a first server to a second server; selecting, by the component selection program, a first Input/Output (I/O) virtualization component associated with the first server and a second I/O virtualization component associated with the second server for migrating the first VM; creating, by the component selection program, a map of network adapters associated with the first and second I/O virtualization components; selecting, by the component selection program, first network adapters associated with the first I/O virtualization component and second network adapters associated with the second I/O virtualization based, at least in part, on the map of network adapters; and sending, by the component selection program, an indication of the selected first and second I/O virtualization components and the selected first and second network adapters to be used for migrating the first VM. A corresponding computer program product and computer system are also disclosed herein.

DETAILED DESCRIPTION

Embodiments of the present invention recognize that at present, the migration of VMs from one physical computer system to another is a process that can realize benefit from being optimized. VM migration is a process that can be optimized and improved through an application of collected utilization data associated with hardware and software components involved in the migration of a VM from a source server (i.e., a computer system hosting the VM) to a destination server. The hardware and software components can be I/O components such as, but not limited to, VIOS and network adapters. Embodiments of the present invention can achieve VM migration optimization using an algorithmic approach to selecting the most suitable I/O components for VM migration based on the utilization data. VM migration optimized in this manner can result in a more efficient use of the I/O components and reduce the amount of time required for VM migration.

The drawbacks to current, conventional approaches to VM migration recognized by embodiments of the present invention are that the I/O virtualization components chosen for VM migration might be more utilized than other ones that are available. Further, chosen network adapters, associated with chosen I/O virtualization components, may not offer the highest speeds to reach the destination server for VM migration. The chosen network adapters may also be more loaded with other I/O operations. There could be other network adapters which could offer higher speeds of communication and are less utilized. Embodiments of the present invention therefore provide a more efficient, algorithmic approach to the selection of I/O components for improving the performance of VM migration.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

Figure 1:
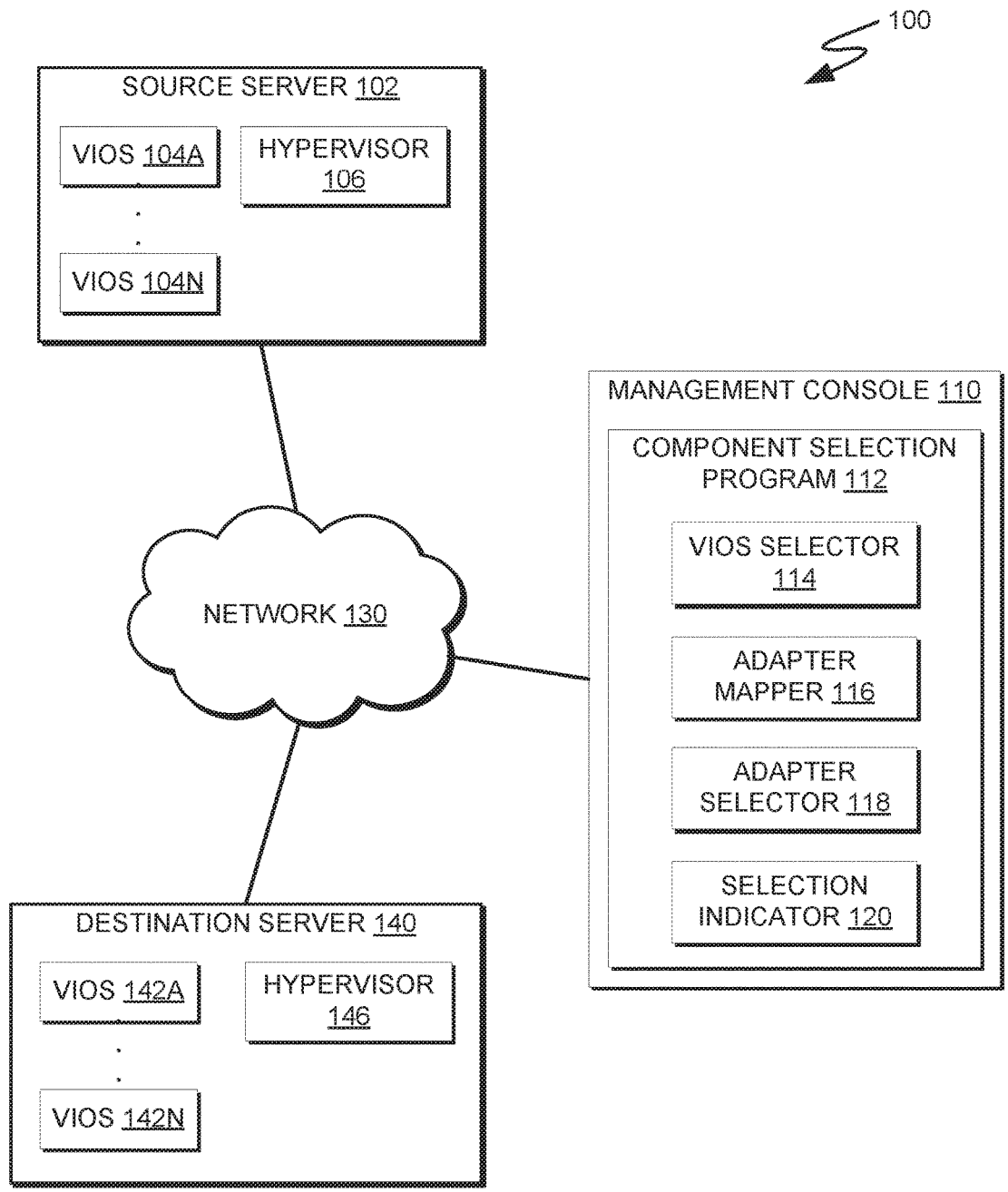
FIG. 1 is a functional block diagram illustrating a distributed data processing environment, in accordance with an embodiment of the present invention.

The present invention will now be described in detail with reference to the figures. FIG. 1 is a functional block diagram illustrating a distributed data processing environment 100, in accordance with one embodiment of the present invention. Distributed data processing environment 100 comprises source server 102, management console 110 and destination server 140, all interconnected over network 130. In other embodiments, distributed data processing environment 100 comprises additional servers which VMs can be migrated to and from.

Management console 110 can be a laptop computer, tablet computer, netbook computer, personal computer (PC), a desktop computer, a personal digital assistant (PDA), a smart phone, or any programmable electronic device capable of communicating with source server 102 and destination server 140 via network 130. Management console 110 is a system used for managing the operation of servers in distributed data processing environment 100 and can be, for example, Hardware Management Console by IBM. Management console 110 comprises component selection program 112 for optimizing VM migration based on a dynamic selection of I/O components involved in VM migration. Management console 110 may include internal and external hardware components, as depicted and described in further detail with respect to FIG. 3.

Component selection program 112 comprises VIOS selector 114, adapter mapper 116, adapter selector 118 and selection indicator 120. VIOS selector 114 is a component for selecting a VIOS on both source server 102 and destination server 140 for optimized VM migration. Adapter mapper 116 is a component which creates a map of entries corresponding to network adapters for the selected VIOS. Adapter selector 118 is a component for selecting network adapters suitable for VM migration optimization, based on the mapping. Selection indicator 120 is a component capable of providing indication of the VIOS and network adapter selections to hardware and/or software components of management console 110 responsible for carrying out VM migration.

In various embodiments of the present invention, source server 102 and destination server 140 can respectively be laptop computers, tablet computers, netbook computers, personal computers (PCs), desktop computers or any programmable electronic devices capable of communicating with management console 110 via network 130. Source server 102 comprises VIOS 104A-N and hypervisor 106. In general, VIOS 104A-N are representative of any number of Virtual I/O Servers for virtualizing physical I/O components associated with source server 102. Hypervisor 106 is a component for the creation and operation of VMs. Similarly, destination server 140 comprises VIOS 142A-N (generally representative of any number of Virtual I/O Servers) and hypervisor 146.

Network 130 can be, for example, a local area network (LAN), a wide area network (WAN) such as the Internet, or a combination of the two, and can include wired, wireless, or fiber optic connections. In general, network 130 can be any combination of connections and protocols that will support communications between source server 102, management console 110 and destination server 140.

Figure 2:
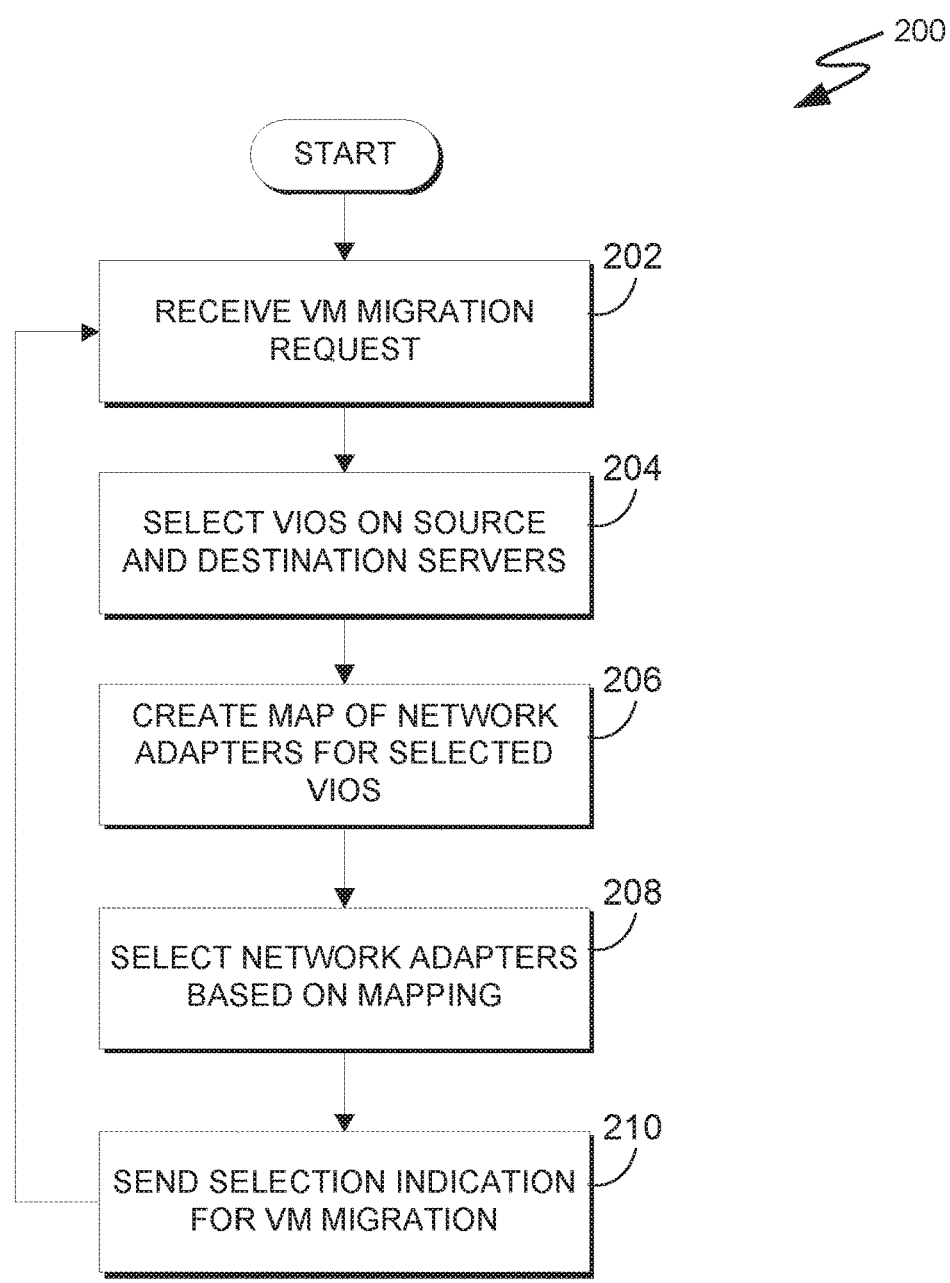
FIG. 2 is a flowchart depicting operational steps of a component selection program for optimizing virtual machine migration, in accordance with an embodiment of the present invention.

FIG. 2 is a flowchart 200 depicting operational steps of component selection program 112 for optimizing VM migration, in accordance with an embodiment of the present invention. The illustrative example of FIG. 2 is provided to facilitate discussion of aspects of the present invention, and it should be appreciated that FIG. 2 provides only an illustration of an embodiment of the present invention and does not imply any limitations with regard to the variations or configurations in which different embodiments may be implemented.

Component selection program 112 receives a request for migration of a VM (step 202). For example, the request is for a VM operational on source server 102 to be migrated to destination server 140. The request can be received, for example, from source server 102 via network 130. Alternatively, the request can be initiated on management console 110.

VIOS selector 114 selects an I/O virtualization component on source server 102 and destination server 140 for VM migration (step 204). Responsive to receiving the request for VM migration, VIOS selector 114 iterates through available I/O virtualization components on source server 102 (e.g., VIOS 104A-N) and selects an I/O virtualization component that is least utilized amongst other I/O virtualization components associated with source server 102. VIOS selector 114 takes into account collected, historical and/or current utilization data associated the I/O virtualization components to make the selection according to predetermined criteria. Component selection program 112 can communicate with source server 102 to access the utilization data, which can pertain to resource utilization, e.g., CPU, memory and/or storage utilization. For example, VIOS selector 114 algorithmically selects an I/O virtualization component which is currently the least utilized on source server 102 according to current utilization data.

In a similar manner, VIOS selector 114 iterates through available I/O virtualization components associated with destination server 140 (e.g., VIOS 142A-N) for selecting an I/O virtualization component for VM migration. VIOS selector 114 takes into account collected, historical and/or current utilization data of the I/O virtualization components associated with destination server 140 to make the selection according to predetermined criteria, e.g., the currently least utilized I/O virtualization component is chosen.

For the selected I/O virtualization components, adapter mapper 116 creates a map of entries, such as, but not limited to, a table or spreadsheet, associated with network adapters available for VM migration (step 206). The map of entries comprises available network adapters (associated with the selected I/O virtualization components) and the supported and/or maximum speeds corresponding to each available network adapter. This mapping is created for a subsequent selection of suitable network adapters to be used for VM migration.

Adapter selector 118 selects (e.g., algorithmically) suitable network adapters of the available network adapters (associated with the selected I/O virtualization components) for VM migration (step 208). Adapter selector 118 selects network adapters associated with the selected I/O virtualization components according to predetermined criteria, based on a combination of utilization data associated with the network adapters (e.g., historical and/or current) and the map of network adapters indicating the supported speeds. It should be noted that the selected I/O virtualization components may be providing virtualization of the associated available network adapters.

For example, adapter selector 118 determines which network adapters of the available network adapters (associated with source server 102 and destination server 140) are currently the least utilized and offer the highest supported speeds for data transfer amongst the least utilized network adapters. From among the available network adapters, the least utilized network adapters can be determined based on a predetermined threshold of usage, e.g., less than 50% current usage against maximum usage capacity. A selection based on this determination offers a more optimized rate of data transfer between source server 102 and destination server 140 and offers an efficient use of the network adapters.

As a more detailed example, if there are two network adapters associated with a selected VIOS on source server 102 with 10 Gbps (gigabytes per second) and 12 Gbps speeds, respectively, and destination server 140 has a selected VIOS configured with a network adapter of 10 Gbps speed, adapter selector 118 can select the 10 Gbps network adapter of source server 102. Alternatively, if the 10 Gbps adapter associated with source server 102 is currently at 80% usage capacity but the 12 Gbps adapter associated with source server 102 is only currently at 10% usage capacity, the 12 Gbps adapter is selected, resulting in better performance for VM migration.

It should be noted that in some embodiments, component selection program 112 selects a suitable I/O virtualization component (e.g., from amongst VIOS 104A-N) and associated suitable network adapters on source server 102 for VM migration before subsequently selecting suitable I/O components associated with destination server 140, or vice versa.

Selection indicator 120 communicates with appropriate hardware and/or software components of management console 110 to indicate which I/O virtualization components and network adapters (associated with source server 102 and destination server 140) were algorithmically selected for VM migration (step 210). Selection indicator sends the indication to the appropriate hardware and/or software components so that the selected I/O components will be used for migrating a VM from source server 102 to destination server 140. For example, if VIOS 104A on source server 102 and VIOS 142A on destination server 140 have been selected by for VM migration, the indication sent will specify VIOS 104A and VIOS 142A as the selected I/O virtualization components to be used for VM migration.

Figure 3:
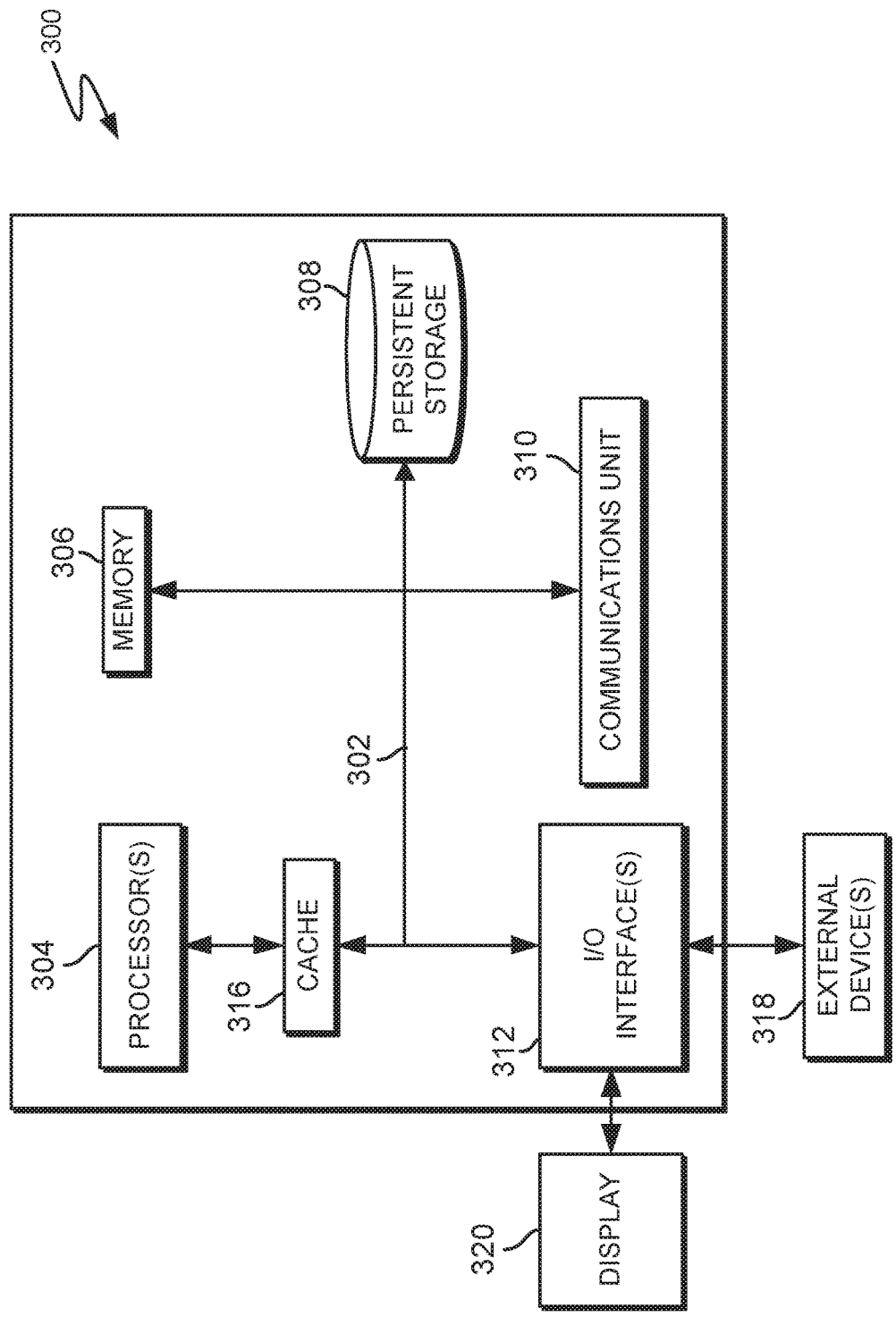
FIG. 3 is a block diagram of components of a management console executing the component selection program, in accordance with an embodiment of the present invention.

FIG. 3 depicts a block diagram 300 of components of management console 110 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Management console 110 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Component selection program 112 can be stored in persistent storage 308 and in memory 306 for execution by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 can also be removable. For example, a removable hard drive can be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 can provide communications through the use of either or both physical and wireless communications links. Component selection program 112 can be downloaded to persistent storage 308 through communications unit 310.

I/O interface(s) 312 allows for input and output of data with other devices that can be connected to management console 110. For example, I/O interface 312 can provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., component selection program 112, can be stored on such portable computer readable storage media and can be loaded onto persistent storage 308 via I/O interface(s) 312. I/O interface(s) 312 also connect to a display 320. Display 320 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for optimizing Virtual Machine (VM) migration, the method comprising:
   receiving, by a component selection program, a request to migrate a first VM from a first server to a second server wherein the first server and the second server are connected by a network;
   selecting, by the component selection program, a first Input/Output (I/O) virtualization component associated with the first server and a second I/O virtualization component associated with the second server for migrating the first VM, wherein the selection is based on both historical utilization data and iterating through available I/O virtualization components associated with the first and second servers;
   creating, by the component selection program, a map of network adapters associated with the first and second I/O virtualization components;
   selecting, by the component selection program, first network adapters associated with the first I/O virtualization component and second network adapters associated with the second I/O virtualization component based, at least in part, on the map of network adapters wherein the first network adapters associated with the first I/O virtualization component is suitably selected before selecting the second network adapters associated with the second I/O virtualization component; and sending, by the component selection program, an indication of the first and second I/O virtualization components selected and the first and second network adapters selected to be used for migrating the first VM.

2. The method of claim 1, wherein the first and second I/O virtualization components are selected based on a determination that the first and second I/O virtualization components are least utilized among the available I/O virtualization components, according to utilization data associated with the available I/O virtualization components.

3. The method of claim 1, wherein the map of network adapters comprises entries comprising available network adapters associated with the first and second I/O virtualization components selected and supported speeds of data transfer corresponding to the available network adapters.

4. The method of claim 3, wherein selecting the first and second network adapters among the available network adapters is further based on utilization data associated with the available network adapters.

5. The method of claim 4, wherein first and second network adapters are determined to be within a predetermined threshold of current usage.

6. The method of claim 5, wherein the first and second network adapters are selected for VM migration based on a determination that the first and second network adapters offer highest supported speeds of data transfer amongst a group of least utilized network adapters within the predetermined threshold of current usage.

7. A computer program product for optimizing Virtual Machine (VM) migration, the computer program product comprising:
one or more computer readable storage media and program instructions stored on the one or more computer readable storage media, the program instructions comprising:
program instructions to receive, by a component selection program, a request to migrate a first VM from a first server to a second server wherein the first server and the second server are connected by a network;
program instructions to select, by the component selection program, a first Input/Output (I/O) virtualization component associated with the first server and a second I/O virtualization component associated with the second server for migrating the first VM, wherein the selection is based on both historical utilization data and iterating through available I/O virtualization components associated with the first and second servers;
program instructions to create, by the component selection program, a map of network adapters associated with the first and second I/O virtualization components;
program instructions to select, by the component selection program, first network adapters associated with the first I/O virtualization component and second network adapters associated with the second I/O virtualization component based, at least in part, on the map of network adapters wherein the first network adapters associated with the first I/O virtualization component is suitably selected before selecting the second network adapters associated with the second I/O virtualization component; and
program instructions to send, by the component selection program, an indication of the first and second I/O virtualization components selected and the first and second network adapters selected to be used for migrating the first VM.

8. The computer program product of claim 7, wherein the first and second I/O virtualization components are selected based on a determination that the first and second I/O virtualization components are least utilized among the available I/O virtualization components, according to utilization data associated with the available I/O virtualization components.

9. The computer program product of claim 7, wherein the map of network adapters comprises entries comprising available network adapters associated with the first and second I/O virtualization components selected and supported speeds of data transfer corresponding to the available network adapters.

10. The computer program product of claim 9, wherein selecting the first and second network adapters among the available network adapters is further based on utilization data associated with the available network adapters.

11. The computer program product of claim 10, wherein first and second network adapters are determined to be within a predetermined threshold of current usage.

12. The computer program product of claim 11, wherein the first and second network adapters are selected for VM migration based on a determination that the first and second network adapters offer highest supported speeds of data transfer amongst a group of least utilized network adapters within the predetermined threshold of current usage.

13. A computer system for optimizing Virtual Machine (VM) migration,
the computer system comprising:
one or more computer processors;
one or more computer readable storage media;
program instructions stored on the one or more computer readable storage media for execution by at least one of the one or more processors, the program instructions comprising:
program instructions to receive, by a component selection program, a request to migrate a first VM from a first server to a second server wherein the first server and the second server are connected by a network;
program instructions to select, by the component selection program, a first Input/Output (I/O) virtualization component associated with the first server and a second I/O virtualization component associated with the second server for migrating the first VM, wherein the selection is based on both historical utilization data and iterating through available I/O virtualization components associated with the first and second servers;
program instructions to create, by the component selection program, a map of network adapters associated with the first and second I/O virtualization components;
program instructions to select, by the component selection program, first network adapters associated with the first I/O virtualization component and second network adapters associated with the second I/O virtualization component based, at least in part, on the map of network adapters wherein the first network adapters associated with the first I/O virtualization component is suitably selected before selecting the second network adapters associated with the second I/O virtualization component; and
program instructions to send, by the component selection program, an indication of the first and second I/O virtualization components selected and the first and second network adapters selected to be used for migrating the first VM.

14. The computer system of claim 13, wherein the first and second I/O virtualization components are selected based on a determination that the first and second I/O virtualization components are least utilized among the available I/O virtualization components, according to utilization data associated with the available I/O virtualization components.

15. The computer system of claim 13, wherein the map of network adapters comprises entries comprising available network adapters associated with the first and second I/O virtualization components selected and supported speeds of data transfer corresponding to the available network adapters.

16. The computer system of claim 15, wherein selecting the first and second network adapters among the available network adapters is further based on utilization data associated with the available network adapters.

17. The computer system of claim 16, wherein first and second network adapters are determined to be within a predetermined threshold of current usage.

\* \* \* \* \*